Nov. 24, 1953     A. BIASI     2,659,896
UNIVERSALLY MOUNTED ARTIFICIAL PNEUMATIC HAND
Filed Dec. 18, 1951     3 Sheets-Sheet 3
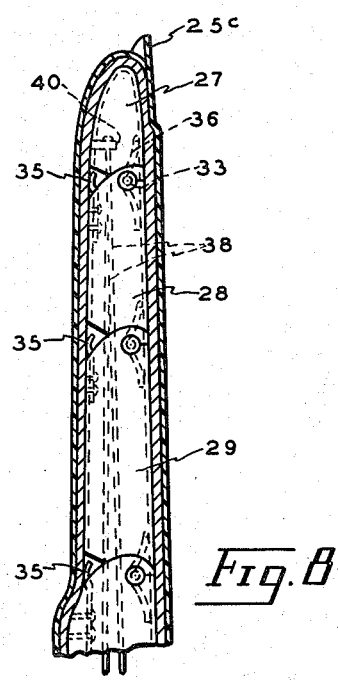
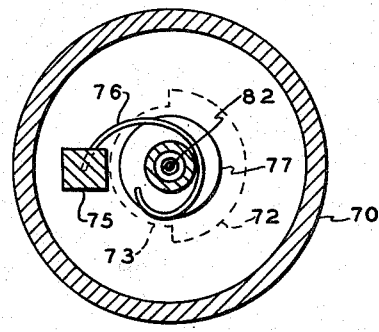
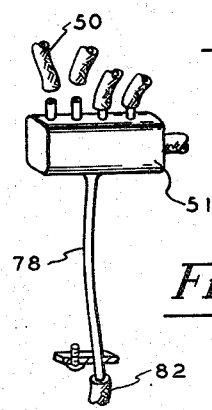
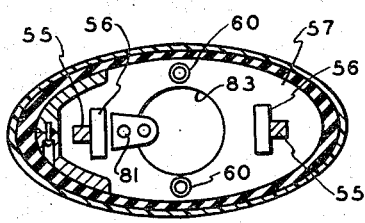
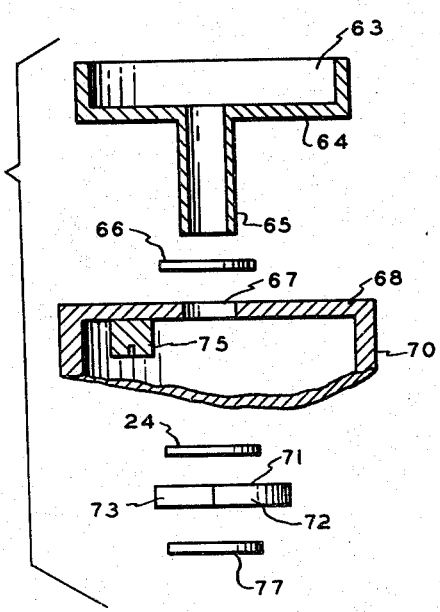
INVENTOR
ANGELO BIASI
BY *Gustave Miller*
ATTORNEY Patented Nov. 24, 1953

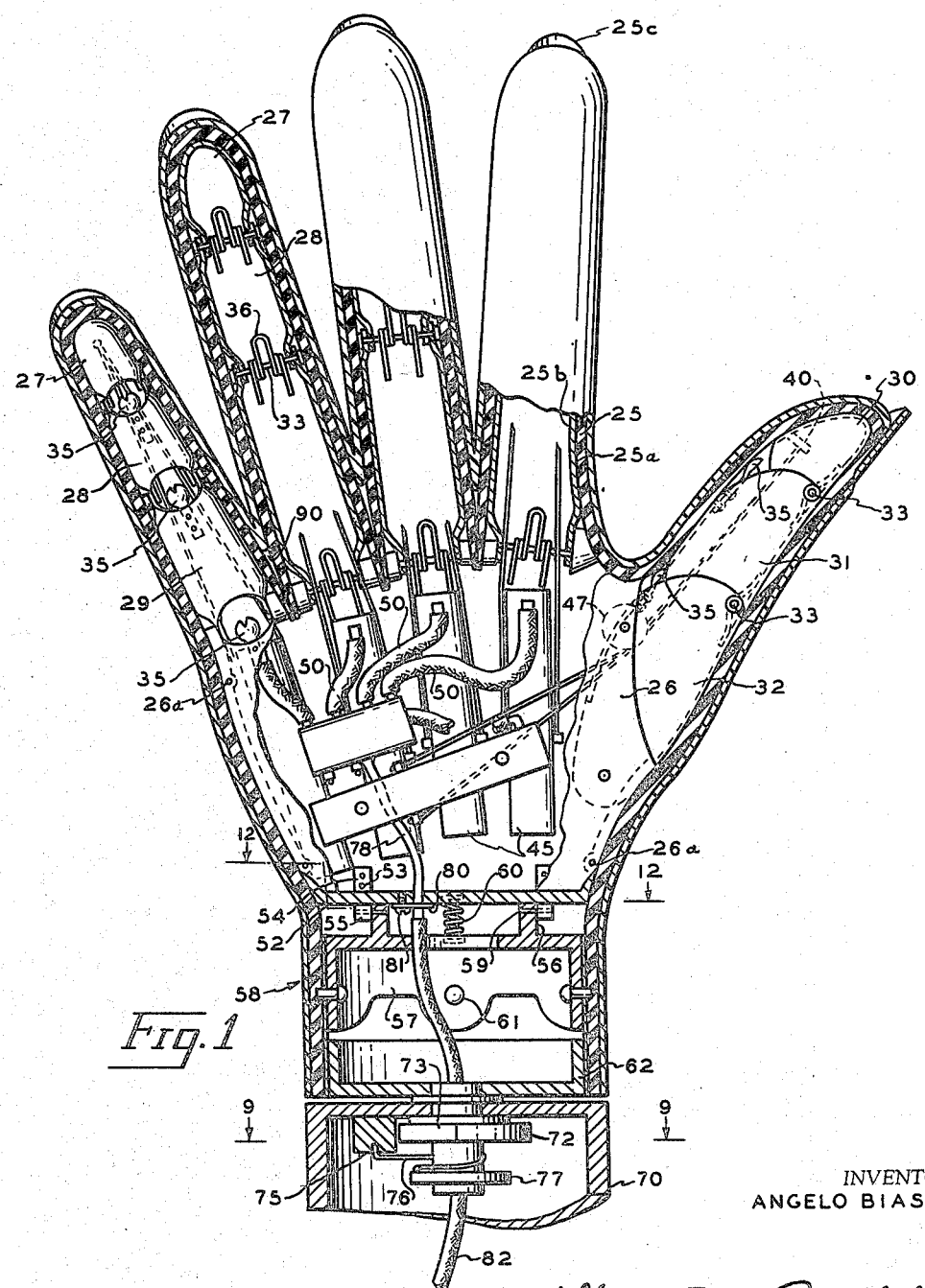

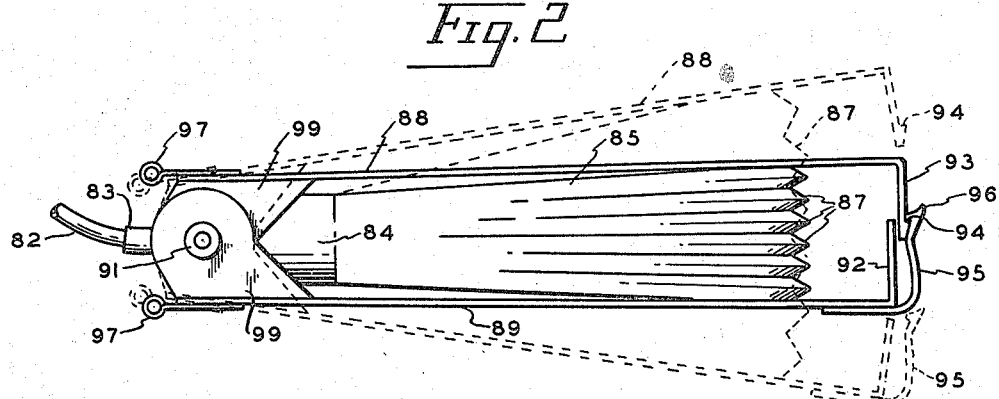
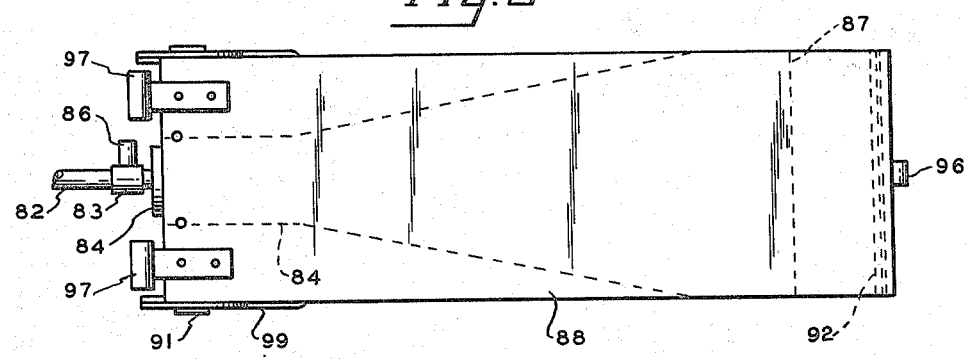
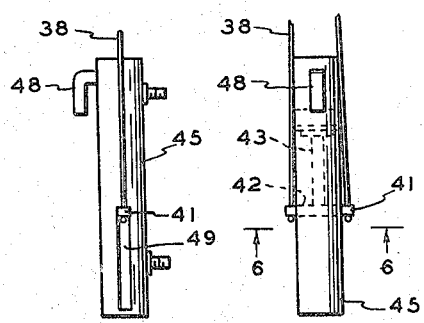
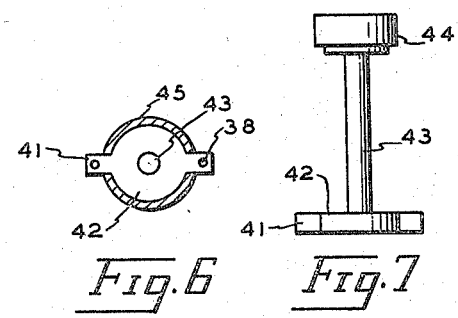

2,659,896

UNITED STATES PATENT OFFICE 2,659,896

UNIVERSALLY MOUNTED ARTIFICIAL PNEUMATIC HAND

Angelo Biasi, Wilkes-Barre, Pa.

Application December 18, 1951, Serial No. 262,278

8 Claims. (Cl. 3—12.7)

This invention relates to new and useful improvements in an artificial pneumatically actuated hand and to means for mounting such hand for limited universal movement in relation to the arm stump or to an arm stump extension.

A further object of this invention is to provide an artificial pneumatic hand which is an improvement over that shown in U. S. Patent No. 2,545,947.

More particularly the present invention proposes an improved artificial hand, whether of the type simulating closely an actual hand in external conformation, coloration and the like or of the type including relatively movable grab hooks, and the aim is to provide a novel and valuable such hand wherein means are provided for moving all the fingers and thumb and in the case of each at the several joints thereof, in unison, with each of these five digital members being inclusive of joints corresponding to all those in the human hand and further with the artificial hand inclusive of a joint substantially like that between the metacarpal region and the wrist, and all in combination with a placement of and construction for said joints such that multiple flexure of each of said digital members and pivotal movement of the wrist may be present in a markedly close resemblance to actual digital flexures and wrist movement in the human body.

Another particular object of the invention is to provide an artificial hand which may be readily caused to assume, relative to an object or article to be held, a grip as strong (for example, one adequate to seize and hold an object or article weighing ten pounds) as that which can be exerted by a human hand of other than phenomenal strength.

A further particular object of the invention is to provide an artificial hand as above which is equipped with resiliently yielding means for normally holding the digital members straight and unbent at the knuckles and the like and also for holding the wrist region to the normal ordinary extended position, and which in combination with the resiliently yielding means incorporates pneumatically actuated and operating means completely under the control of the wearer of the new hand and in such wise that at will he may govern the finger and thumb movements, and this inconspicuously and indeed substantially invisibly, exactly as desired.

A further feature of this invention is to provide a means for mounting the artificial pneumatic hand of this invention on an arm stump extension member so that the artificial hand is capable of substantially the same limited universal movement as the natural hand, that is, it may pivot forward and backward about the same amount that the natural hand may, and it may also rotate about the longitudinal axis of the arm about 90 degrees in either direction from a neutral position, just as in the case of the natural hand, and is provided with yieldable means normally urging it to the neutral position when not in use.

According to the present invention, the artificial hand, furthermore, may be made of relatively light weight, with its working parts rugged and long enduring, and with the outer appearance of the hand closely simulative of the skin sheathing of a human hand.

With the major inner parts of the hand constructed of fairly hard aluminum, as a suitable aluminum alloy, or of a suitable plastic, to obtain strength with slight weight, the outer covering or sheathing for the new hand may well be of canvas or some other suitable textile or other sheet material, or, ideally, of a fairly soft and freely flexible natural or synthetic rubber or like composition. This last-named material in the course of the making of said sheathing may be textured like the human skin and then or thereafter colored and otherwise made to look exactly like the epidermis of a human hand, whether the new artificial hand is in repose or in action; even to the extent of the inclusion of such additions as artificial finger-nails and such hirsute minutiae as would be appropriate in the case of an adult male's hand.

Another object of the present invention proposes forming the outer sheathing of an inner portion of rubber and an outer portion of a suitably colored skin-like flexible resinous plastic material and to form the inner portion at the bases of the fingers with slits in a manner to render the sheathing more flexible for greater finger movement.

It is a further object of the present invention to construct an artificial hand which is simple and durable and which can be manufactured and sold at a reasonable cost.

With the foregoing and other objects in view, this invention comprises the combination, construction and arrangement of parts hereinafter set forth, claimed and disclosed in the accompanying drawings, wherein:

Fig. 1 is an elevational view, looking at the palm side of the artificial hand, but with the skin sheath shown partly in section and partly broken away and with certain of the inner parts broken away.

Fig. 2 is a side edge view of the arm pit mounted master bellows, shown in closed position.

Fig. 3 is a top plan view of Fig. 2.

Fig. 4 is a side view of one of the digital actuating pistons and cylinders.

Fig. 5 is a view looking from the left of Fig. 4.

Fig. 6 is a sectional view on line 6—6 of Fig. 5.

Fig. 7 is an enlarged view of the pneumatic piston connecting rod and cross head as used in Figs. 4 and 5.

Fig. 8 is a longitudinal sectional view taken through one of the fingers of the artificial hand.

Fig. 9 is a sectional view of the stump extension member on line 9—9 of Fig. 1.

Fig. 10 is a perspective view of the manifold.

Fig. 11 is an exploded view, partly in section, of the wrist to stump pivot.

Fig. 12 is a sectional view of the wrist on line 12—12 of Fig. 1.

The artificial hand, according to the present invention, includes a sheathing 25 which encloses the major portion of the artificial hand. The sheathing is comprised of an inner portion 25a of rubber and an outer portion 25b. The outer portion 25b may be made of cloth or other similar flexible material, but is preferably made of one of the skin-like flexible resinous plastic materials suitably colored to closely resemble the color of the skin of a normal hand. The inner portion 25a of the sheathing 25, between each of the four fingers and at the base thereof, is formed with slits 90, see Fig. 1. The slits 90 make the sheathing somewhat more flexible and frees each of the fingers for easier movement with relation to each other and the palm portion of the artificial hand.

At suitable points at the ends of the fingers and the thumb of the artificial hand, at the back thereof, the inner portion 25a of the sheathing 25 is exposed through the outer portion 25b and has secured thereto artificial finger-nails 25c. The finger-nails 25c are also preferably formed of a suitably colored resinous plastic material and are secured in position by means of a mucilage having affinity for the rubber of the inner portion 25a and the material of which the finger-nails 25c are formed.

Inside the sheathing there is positioned a cavitated metacarpal member 26. The metacarpal member 26 is formed of two opposed molded portions secured together by removable screws 26a, see Fig. 1. Also, similarly positioned within the sheathing 25 are the three members for the three phalanges of each of the four fingers and the thumb of the hand, in the case of each of the four fingers these members are respectively designated 27, 28 and 29. The three thumb members are respectively marked 30, 31 and 32.

Each adjacent pair of the members 27 and 28, 28 and 29, 29 and 26, 30 and 31, 31 and 32, 32 and 26, meet at a joint incorporating a pivot pin 33, as shown in Figs. 1 and 8.

The meeting ends of any two adjacent members at any joint along a finger or thumb overlap each other and the respective pivot pin 33, as indicated at 34; thereby to allow the fingers and the thumb to be not only straightened out but also to be bent at a desired joint along the finger or thumb length. At the same time, to prevent collapse and inward creasing and perhaps pinching of the sheathing 25, at the palm sides of the fingers and at the palm adjacent side of the thumb, there is at such joint, a stamped metal shield 35, said shield suitably secured at one end portion to the end portion of one of the members meeting at said joint. Also at said joint is a single bent wire torsion spring 36, engaged with the parts in the manner shown to hold the finger and thumb members in their longitudinal extended positions.

As indicated in Figs. 1 and 8, lengthwisely of each of the members of the fingers and of the thumb, the members are tubular for the passage of flexible pull cables or cords 38 in such manner that the cables 38 extend all the way from the cavitation in the metacarpal member 26 through a finger or thumb to an anchor post 40, in the hollow interior of the middle in the hollow interior of the outermost member 27 or 30 of that finger or thumb.

The opposite ends of each pair of cables 38 are secured to the opposite ends 41 of a cross head 42 secured by a connecting rod 43 to a pneumatic piston 44 movable within a pneumatic cylinder 45 suitably secured by threaded studs 46 within the metacarpal member 26. As shown in Fig. 1, there are five cylinders 45, one for each of the four fingers in side by side relation slightly diverging from each other as shown in Fig. 1, each pointing toward a particular finger, and a fifth one secured to the palm portion of the metacarpal member 26 and pointing somewhat toward the thumb member, transversely of the first four finger cylinders. The cables 38 from the thumb post 40 pass around a roller 47 secured within metacarpal member 26 so as to provide maximum efficiency.

Each cylinder 45 has a nipple 48 which is connected by a tube 50 to a manifold 51. As will be apparent, air pressure from manifold 51 through tubes 50 will cause pneumatic pistons 44 to move down within cylinders 45, the cross head ends 41 moving through opposite slits 49 in cylinders 45, to thereby pull the cables 38 and thus move or bend each finger and thumb simultaneously toward the palm of the hand to a grasping or gripping position. This movement is yieldably resisted by the springs 36 about the pivot pins 33, and when the air pressure is released, these springs 36 restore the fingers to the normal straight position.

The wrist end of the metacarpal member 26 is provided with a transverse wrist plate 52 secured thereto by extending tabs 53 and rivets 54. On the opposite side, the wrist plate 52 is provided with a pair of spaced apart hinge posts 55 through which hinge pins extend into hinge post 56 projecting upwardly from a crown member 57 forming part of the wrist 58, the pivot pins between hinge posts 55 and 56 being shown at 59. The back and forward pivotal motion of the palm or hand relative to the wrist 58 permitted by this pivotal connection on the pivot pins 59 is biased in either direction by two fairly stiff closely wound coil springs 60, each having its end portion fitted into cylindrical recesses which are upwardly extending into the bottom of the metacarpal plate 54 and which are matchingly downwardly extended into the crown member 57 of the wrist 58.

The crown plate 57 is riveted at 61 within a wrist cylinder 62 to the other end of which is secured the flange 63 of the flange head 64 of the hollow pivot 65. This hollow pivot 65 extends through a spacer washer 66 and then through a central opening 67 in the end plate 68 of the stump extension 70.

In order to limit the rotation of the hand and the wrist 58 relative to the stump 70 to about the normal ninety degree position in either direction from the neutral position, a segmented wheel 71 having one half of a large diameter at 72 and the other half of a small diameter at 73 is secured on the hollow pivot 65, spaced from the inner surface of stump extension plate 68 by a spacing washer 74. Secured to the inside of stump extension plate 68 is a block 75 in such position that the smaller diameter portions 73 of wheel 72 may freely rotate thereby, but so that the abutting shoulders between the smaller diameter 73 and the larger diameter 72 will hit either side of block 75 and prevent rotation beyond the limited amount desired. A coil spring 76 having one end secured in block 75 and the other end secured in a washer 77 which in turn is fixed on the hollow pivot 65 permits rotation of the hollow pivot 65 in either direction until the shoulder on wheel portion 72 abuts the block 75 and tends to restore it to neutral position when pressure thereon is released. Thus due to the pivotal connection between metacarpal end plate 52 and wrist crown 57, and the limited rotary connection between the wrist portion 58 and the stump extension 70, a limited universal movement of the hand relative to the arm is provided for. The movement between the palm portion of the hand and the wrist portion 58 is so limited that the same sheath 25 extending over the metacarpal member also extends over the wrist portion 58.

From the manifold 51 there extends a long pressure port 78 which extends through an opening in the metacarpal end plate 52 and through a reinforcing ear 80 secured at 81 thereto. Secured over the end of this port 78 is a flexible pressure tube 82 which extends through an opening 83 in the wrist crown 57, then through hollow pivot 65 and through the stump extension 70 where it is secured to a nipple 83 from a manifold 84 secured within one end of a flexible bellows 85. Also secured to the nipple 83 is a one way inlet valve 86 which will permit air to enter the bellows 85 but will not permit air to escape therefrom.

The flexible bellows 85 which has one end secured on the manifold 84 has its other end accordion pleated as at 87 and tends to expand apart as far as possible. This bellows 85 and its manifold 84 is mounted within a frame work provided by a pair of leaves 88 and 89 each having inturned ears 90 which are pivoted together at 91. At the opposite ends, the leaves 88 and 89 are provided with overlapping protecting flanges 92 and 93. One flange as 93 is provided with a latch edge 94 to cooperate with a yieldable latch arm 95 having a finger tip 96 so that the latch may be released by the finger of the other hand of the user.

At the pivot end of the bellow frame leaves 88 and 89, each leaf 88 and 89 is provided with a pair of strap receiving eyes 97 to which suitable straps may be adjustably secured for mounting the bellows 85 in the arm pit.

In operation, with the bellows 85 suitably mounted in the arm pit, and the tube 82 connected to the manifold 51, the artificial hand may be manipulated as desired to grip an article or release it, and further, to maintain the grip thereon without effort on the part of the user until he is ready to release the same. To cause the artificial hand to activate its fingers and thumb to grip any article, the user merely raises his upper arm down against the bellows within his arm pit thus causing pressure to flow through tube 82 and to each of the cylinders 45, causing the cables 38 to pull the fingers and thumb toward the palm to grasp the article. Greater pressure may be applied to the bellows to cause greater pressure to the fingers and thus more firmly secure the article. If desired to hold the article for any extended time, the user will then squeeze the bellows 85 until the latch arm 95 engages over the latch hook 94 thus holding the fingers continuously in grasp position. When ready to release the article, the user will use his other hand and pull the finger grip 96 loose thus releasing the pressure and thus permitting his artificial hand to release its grasp. The artificial hand will yield back and forth about its transverse pivots and may rotate about its axial pivot as previously described as the artificial hand is placed against any article which is to be grasped, this limited universal movement taking place as needed.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. In an artificial hand, the combination, with a generally flexible and elastically stretchable casing therefor, of a plurality of inter-articulated members including a metacarpal member, four fingers and a thumb the several parts being pivotally interconnected to simulate the structure of a human hand, three members representative of the three actual phalange bones of each such elongate finger and thumb, in the case of each finger and the thumb the two outer ones of said members being pivotally interconnected and the innermost one thereof being pivotally connected to said metacarpal member, resiliently acting means associated with each of such pivotal connections for normally urging said finger and thumb members to non-grasp dispositions relative to the palm side of said metacarpal member, and pneumatically actuated means operable at will for moving said finger and thumb members more and more as desired toward said metacarpal member for grasp-efficacious coaction therewith, the means last-named including a master bellows, said metacarpal member being cavitated and said last-named means also including a plurality of pneumatic cylinders and pistons, all in such cavitation, each piston having a cross head extending through slots in its cylinder and each piston being operatively connected by an elongate flexible pull element to a plurality of the said members of a different one of the artificial fingers and thumb of the hand, said pull elements being present to a total of a pair thereof relative to each of the fingers and thumb and each of said pairs being arranged to be simultaneously pulled by a piston cross head thereby simultaneously to move all three members of the associated finger or thumb toward said metacarpal member.

2. In an artificial hand, the combination, with a generally flexible and elastically stretchable casing therefor, of a plurality of inter-articulated members including a metacarpal member, four fingers and a thumb the several parts being pivotally interconnected to simulate the structure of a human hand, three members representative of the three actual phalange bones of each such elongate finger and thumb, in the case of each finger and the thumb the two outer ones of said members being pivotally interconnected and the innermost one thereof being pivotally connected to said metacarpal member, resiliently acting means associated with each of such pivotal connections for normally urging said finger and thumb members to non-grasp dispositions relative to the palm side of said metacarpal member, and pneumatically actuated means operable at will for moving said finger and thumb members more and more as desired toward said metacarpal member for grasp-efficacious coaction therewith, the means last-named including a master bellows, said metacarpal member being cavitated and said last-named means also including a plurality of pneumatic cylinders and pistons, all in such cavitation, each piston having a cross head extending through slots in its cylinder and each piston being operatively connected by an elongate flexible pull element to a plurality of the said members of a different one of the artficial fingers and thumb of the hand, said pull elements being present to a total of a pair thereof relative to each of the fingers and thumb and each of said pairs being arranged to be simultaneously pulled by a piston cross head thereby simultaneously to move all three members of the associated finger or thumb toward said metacarpal member, in the case of each finger or thumb one end of each of the pull elements of the pair associated with a particular one of said fingers or thumb being connected to the outermost member of that finger or thumb beyond its pivotal connection and the other end of each of the pull elements of the pair being connected to an end of the piston cross head of the particular pneumatic cylinder for that finger or thumb.

3. In an artificial hand, the combination, with a generally flexible casing therefor, of a plurality of interarticulated members including a metacarpal member, four fingers and a thumb the several parts being pivotally interconnected to simulate the structure of a human hand, resiliently acting means associated with each of such pivotal connections for normally urging said members to non-grasp dispositions relative to the palm side of said metacarpal member, pneumatically actuated means operable at will for moving said members more and more as desired toward said metacarpal member for grasp-efficacious coaction therewith, and means for operating said pneumatically actuated means for moving said members toward said metacarpal member or for holding said members in grasp-efficacious coaction with said metacarpal member or for releasing said grasp-efficacious coaction, said operating means including an armpit supported master bellows normally resiliently expanded, a one way inlet valve in said bellows, a frame member for contracting said bellows under arm pressure comprising a pair of leaves pivoted together on opposite sides of said bellows and a pair of cooperating latch members, one on each frame leaf, for holding said bellows in collapsed position.

4. In an artificial hand, the combination, with a generally flexible casing therefor, of a plurality of interarticulated members including a metacarpal member, four fingers and a thumb, the several parts being pivotally interconnected to simulate the structure of a human hand, resiliently acting means associated with each of such pivotal connections for normally urging said members to non-grasp dispositions relative to the palm side of said metacarpal member, pneumatically actuated means operable at will for moving said members more and more as desired toward said metacarpal member for grasp-efficacious coaction therewith, and means for operating said pneumatically actuated means for moving said members toward said metacarpal member or for holding said members in grasp-efficacious coaction with said metacarpal member or for releasing said grasp-efficacious coaction, said operating means including an armpit supported master bellows normally resiliently expanded, a one way inlet valve in said bellows, a frame member for contracting said bellows under arm pressure comprising a pair of leaves pivoted together on opposite sides of said bellows, a pair of cooperating latch members, one on each frame leaf, for holding said bellows in collapsed position, and finger engageable release means on one of said latch members.

5. In an artificial hand, the combination, with a generally flexible casing therefor, of a plurality of interarticulated members including a metacarpal member, four fingers and a thumb the several parts being pivotally interconnected to simulate the structure of a human hand, resiliently acting means associated with each of such pivotal connections for normally urging said members to non-grasp dispositions relative to the palm side of said metacarpal member, pneumatically actuated means operable at will for moving said members more and more as desired toward said metacarpal member for grasp-efficacious coaction therewith, and means for operating said pneumatically actuated means for moving said members toward said metacarpal member or for holding said members in grasp-efficacious coaction with said metacarpal member or for releasing said grasp-efficacious coaction, said operating means including an armpit supported master bellows normally resiliently expanded, a one way inlet valve in said bellows, a frame member for contracting said bellows under arm pressure comprising a pair of leaves pivoted together on opposite sides of said bellows, a pair of cooperating latch members, one on each frame leaf, for holding said bellows in collapsed position, finger engageable release means on one of said latch members, a manifold in said metacarpal member, and a tube between said manifold and said bellows.

6. In an artificial hand, the combination, with a generally flexible casing therefor, of a plurality of interarticulated members including a metacarpal member, four fingers and a thumb the several parts being pivotally interconnected to simulate the structure of a human hand, resiliently acting means associated with each of such pivotal connections for normally urging said members to non-grasp dispositions relative to the palm side of said metacarpal member, pneumatically actuated means operable at will for moving said members more and more as desired toward said metacarpal member for grasp-efficacious coaction therewith, and means for mounting said metacarpal member for universal movement relative to the arm stump comprising an arm stump extension member and a wrist member, axially extending pivotal means between said wrist member and said stump extension member permitting rotation of said wrist member relative to said stump extension member, means limiting said rotation in either direction, and yieldable resilient means urging said wrist to neutral position.

7. In an artificial hand, the combination, with a generally flexible casing therefor, of a plurality of interarticulated members including a metacarpal member, four fingers and a thumb the several parts being pivotally interconnected to simulate the structure of a human hand, resiliently acting means associated with each of such pivotal connections for normally urging said members to non-grasp dispositions relative to the palm side of said metacarpal member, penumatically actuated means operable at will for moving said members more and more as desired toward said metacarpal member for grasp-efficacious coaction therewith, and means for mounting said metacarpal member for universal movement relative to the arm stump comprising an arm stump extension member and a wrist member, axially extending pivotal means between said wrist member and said stump extension member permitting rotation of said wrist member relative to said stump extension member, means limiting said rotation in either direction, and yieldable resilient means urging said wrist to neutral position, said axally extendng pivotal means being hollow, a pneumatic pressure control tube to said pneumatically actuated means in said metacarpal member extending through said wrist member and through said hollow pivotal means to said stump extension member.

8. In an artificial hand, the combination, with a generally flexible casing therefor, of a plurality of interarticulated members including a metacarpal member, four fingers and a thumb the several parts being pivotally interconnected to simulate the structure of a human hand, resiliently acting means associated with each of such pivotal connections for normally urging said members to non-grasp dispositions relative to the palm side of said metacarpal member, pneumatically actuated means operable at will for moving said members more and more as desired toward said metacarpal member for grasp-efficacious coaction therewith, and means for mounting said metacarpal member for universal movement relative to the arm stump comprising an arm stump extension member and a wrist member, hinge means pivoting said metacarpal member to said wrist member for limited movement back and forth normal to said palm side of the hand, spring means resiliently resisting said hinging movement and urging said metacarpal member to neutral position, axially extending pivotal means between said wrist member and said stump extension member permitting rotation of said wrist member relative to said stump extension member, means limiting said rotation in either direction, and yieldable resilient means urging said wrist to neutral position, said axially extending pivotal means being hollow, a pneumatic pressure control tube to said pneumatically actuated means in said metacarpal member extending through said wrist member and through said hollow pivotal means to said stump extension member.

ANGELO BIASI.

References Cited in the file of this patent

UNITED STATES PATENTS

| Number | Name | Date |
|---|---|---|
| 143,439 | Crumlish | Oct. 7, 1873 |
| 2,259,911 | Tancred et al. | Oct. 21, 1941 |
| 2,314,263 | Witt | Mar. 16, 1943 |
| 2,545,947 | Felip et al. | Mar. 20, 1951 |